UNITED STATES PATENT OFFICE.

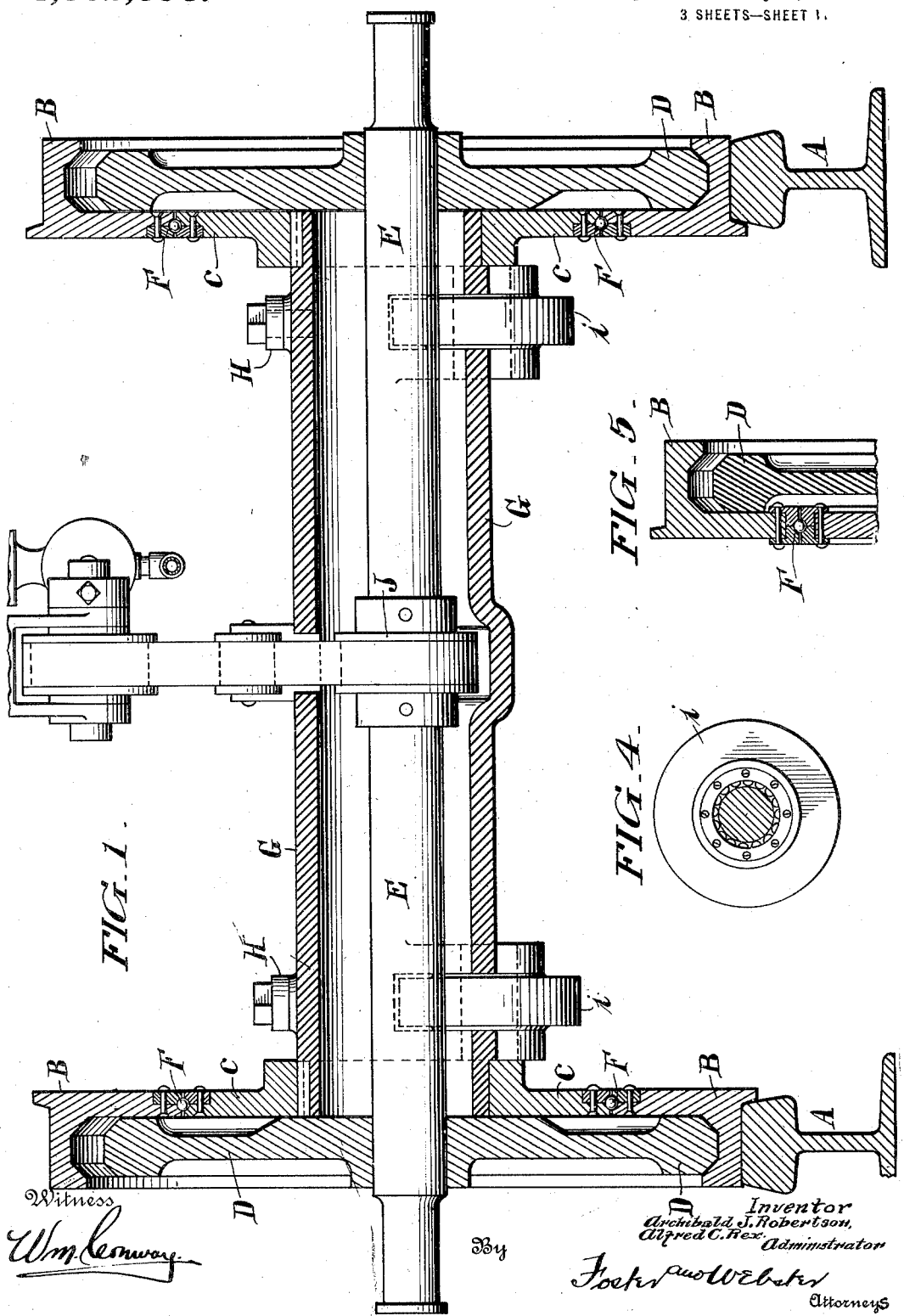

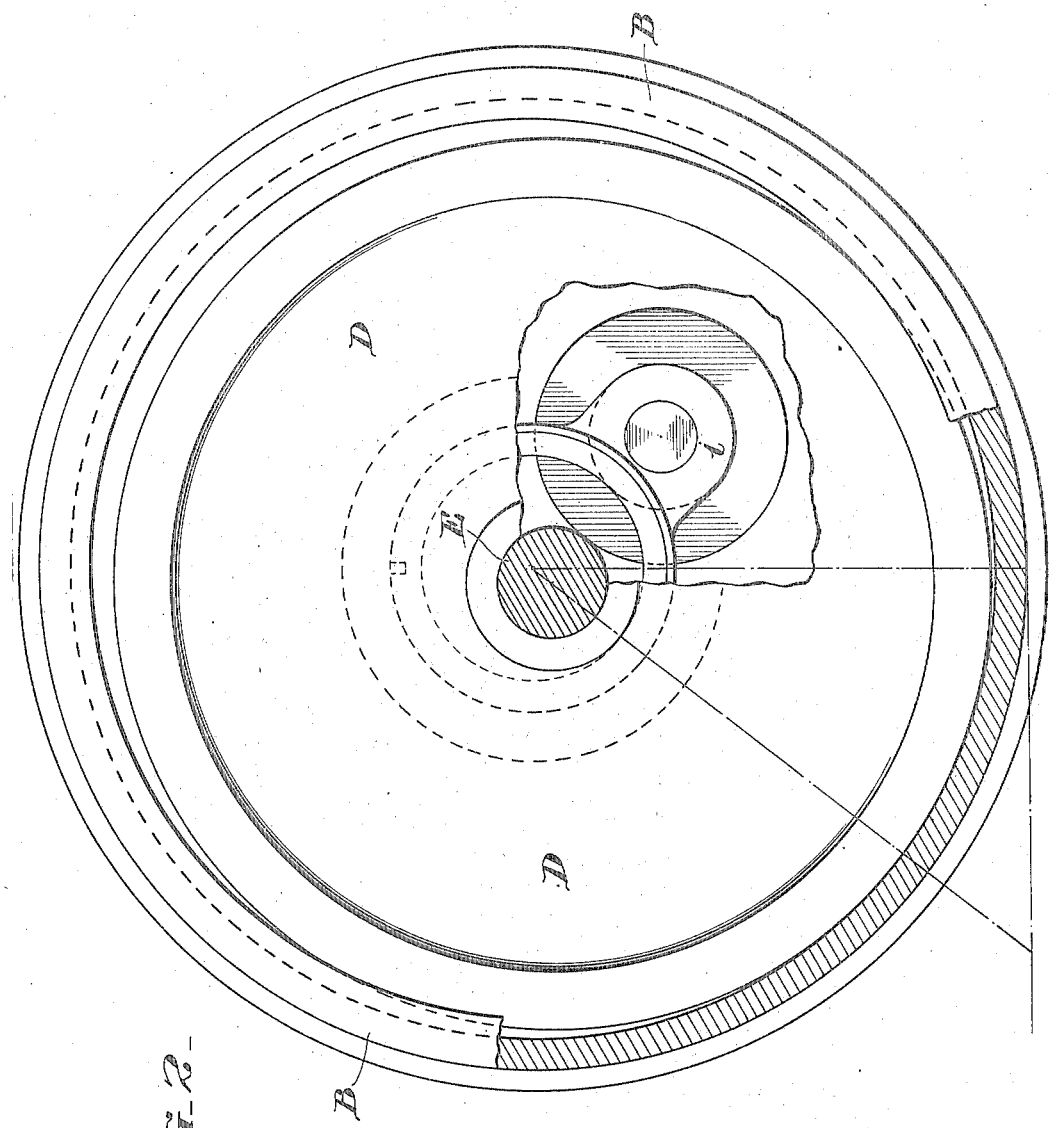

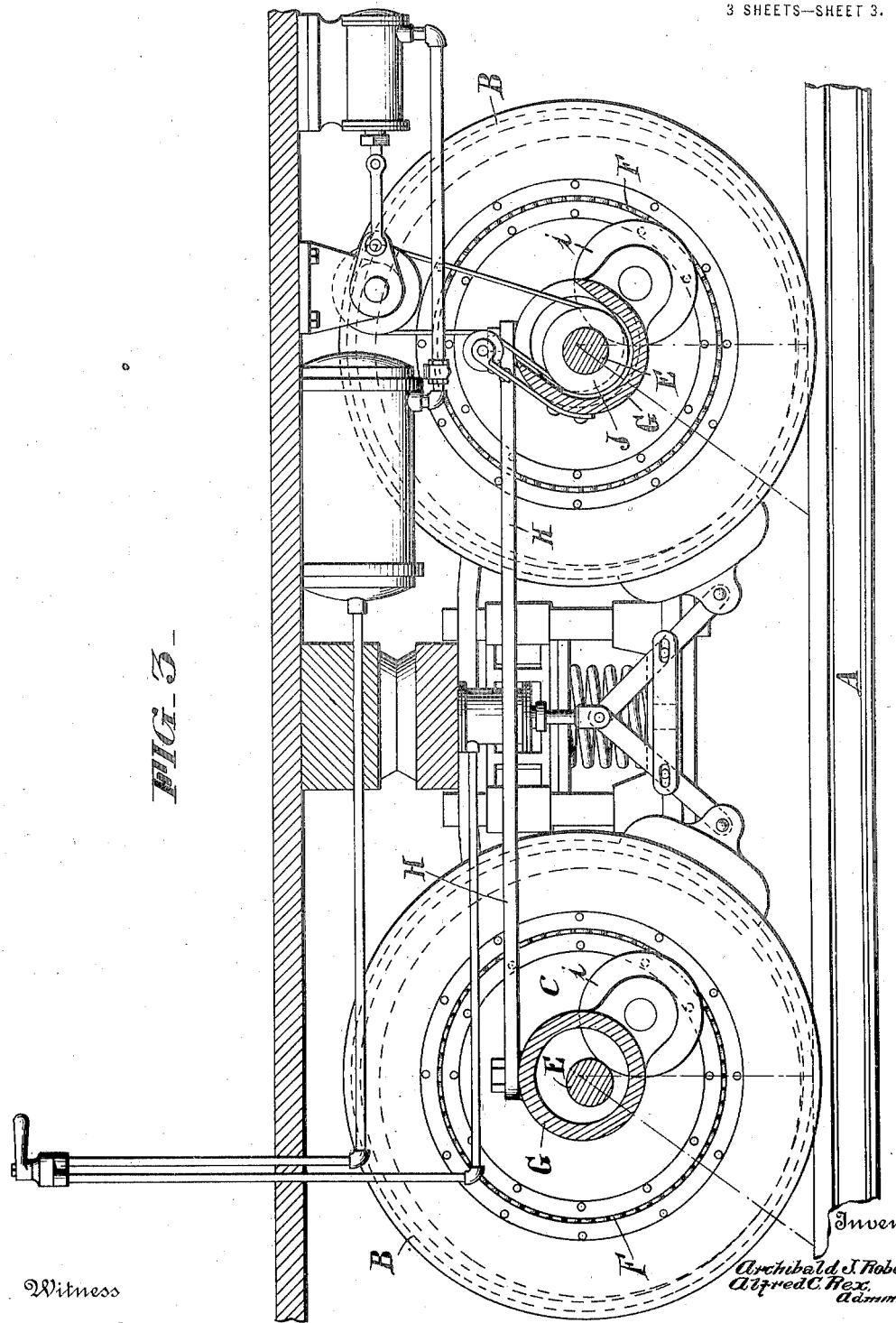

ARCHIBALD J. ROBERTSON, DECEASED, BY ALFRED C. REX, ADMINISTRATOR, OF PHILADELPHIA, PENNSYLVANIA.

AXLE AND WHEEL FOR VEHICLES.

1,302,856.   Specification of Letters Patent.   Patented May 6, 1919.

Application filed September 14, 1916.   Serial No. 120,026.

*To all whom it may concern:*

Be it known that I, ALFRED C. REX, a citizen of the United States, residing at Philadelphia, in the county of Philadelphia and State of Pennsylvania, am the administrator for the estate of ARCHIBALD J. ROBERTSON, and that he has invented certain new and useful Improvements in Axles and Wheels for Vehicles, of which the following is a specification.

This invention relates to wheeled vehicles and has for its object to furnish a wheel and axle whereby said vehicles will be propelled on comparatively level ground or track by the weight thereof, and when going up grade may be assisted by electricity or air, either of which may be used also to operate the brakes, the former may also be used to light and heat the car; the view here shown is for the use of air for braking only, and in order that others skilled in the art to which the invention pertains may make and use the same, I will now proceed to describe the device, alike numerals represent the like parts in the accompanying views of the drawings in which—

Figure (1) shows the entire device, parts being in section.

Fig. (2) shows a side elevation of the same, parts being broken away to more clearly show other parts.

Fig. (3) shows the same as applied to a truck.

Fig. 4 is a modified view showing the wheel which is journaled on the hollow axle to keep the main axle off from the longitudinal center of said hollow axle.

Fig. 5 is a modification showing a hardened raceway and the balls therein which connects the center and outer parts of the larger portion of the wheel.

A is a railway rail, B is the outer portion of the larger part of the wheel, C is the center of the larger portion of said wheel, D is the smaller portion of said wheel, E is the main axle, F is a raceway, G is a hollow axle, H is a link or bar to prevent said hollow axle from revolving, I is a wheel journaled on the hollow axle to hold the main axle off from the longitudinal center of the hollow axle, J is a pulley which has belt contact with the apparatus for compressing air for braking purposes, also connecting with a dynamo for the purpose of lighting and heating the vehicle or operating the brakes.

When the parts are assembled, the operation of the device is as follows:

Hollow axle G, the larger portion of the wheel B and center portion of said wheel C, also wheels I form a unit of this construction, the tread of said larger portion B resting on rail A. Link H is fastened to hollow axles G to prevent said hollow axle from revolving, and the smaller portion of the wheel D is rigidly fastened to main axle E, with the outer periphery thereof resting on the inner periphery of the rim of the larger portion of the wheel B. The axle E, rests against the periphery of wheel I, and the weight of the car body is carried on axle E. Therefore it is obvious that when the brakes are released, the weight of the car would find a resistance only at the point of contact between the outer periphery of the smaller portion of the wheel D and the inner periphery of the rim of the larger portion of the wheel B, with the base of said larger portion B resting on the rail A and the weight of the car carried at this point of no vertical resistance. The larger portion of the wheel B would seek relief from the great downward pressure caused by the weight of the car, and, would find said relief through the raceway F which would furnish a journal between the larger portion of the wheel and the center portion thereof C, around which it would revolve and continue so to do until the brakes were again applied.

While I have described and illustrated one embodiment of the invention, it is to be understood that the invention may be utilized with various other forms of wheeled devices and is not to be limited to the particular apparatus shown, and also various changes may be made in the general form and arrangement of parts without departing from the invention.

Having thus described the device, what is claimed and desired to be secured by Letters Patent is:

1. A railway car truck having a hollow axle the ends of said hollow axle fastened to the central portion of a car wheel, said central portion and the outer portion thereof supplied with a journal bearing, whereby said outer portion of said wheel may revolve around the central portion thereof, a solid axle in said hollow axle, said solid axle supplied with wheels of a less diameter, the periphery thereof resting on the inner periphery of the rim of said outer portion, a wheel journaled on the wall of said hollow axle, the perihpery of said wheel in contact with the said solid axle, to hold said axle off from the longitudinal center of said hollow axle, a pulley on said solid axle in belt connection with means to operate an air brake, and means to prevent said hollow axle from revolving, substantially as described.

2. A vehicle wheel supplied with a hollow axle, said hollow axle fastened to the central portion of said wheel, said center portion and the outer portion thereof supplied with a journaled connection whereby said outer portion may revolve around the said central portion, a solid axle in said hollow axle, said solid axle supplied with a smaller portion of said wheel, the periphery of said smaller portion resting on the inner periphery of the rim of said larger portion of said wheel, a wheel journaled on said hollow axle, the periphery of said wheel in contact with said solid axle to hold said axle off from the center of said hollow axle and means to prevent said hollow axle from revolving, substantially as described.

3. A vehicle wheel supplied with two axles, one of which is hollow and rigidly fastened to the central portion of said wheel, the other axle being solid and revolving within said hollow axle, said solid axle supplied with a wheel, the periphery thereof resting on the inner periphery of the rim of the larger portion of said wheel, a journaled raceway connecting the central and larger portion of said wheel, a wheel journaled on the wall of said hollow axle, the periphery thereof in contact with said solid axle, and means to prevent said hollow axle and the central portion of said wheel from revolving, substantially as described.

4. A wheel and axles for car trucks comprising a hollow axle and a solid axle, said hollow axle securely fastened to the central portion of said wheel, the larger outer portion of said wheel and the central portion thereof journaled together, a solid axle in said hollow axle, a smaller portion of said wheel securely fastened to said axle, the periphery of said smaller portion of the wheel resting on the inner periphery of the rim of said larger outer portion thereof, a wheel journaled on said hollow axle, the periphery thereof in contact with the said solid axle, a link fastened to said hollow axle to prevent said axles from revolving, a pulley fastened to said solid axle, said pulley having driving connection with means for compressing air or making electricity, substantially as described.

In testimony whereof I have signed my name to this specification in the presence of two subscribing witnesses.

ALFRED C. REX,

*Administrator of the estate of Archibald J. Robertson, deceased.*

Witnesses:
  ELEANOR F. MURRAY,
  WILLIAM CONWAY.